(12) United States Patent
Guha et al.

(10) Patent No.: US 12,019,668 B2
(45) Date of Patent: Jun. 25, 2024

(54) DIGITAL DUPLICATE

(71) Applicant: TADA Cognitive Solutions, LLC, Peoria, IL (US)

(72) Inventors: Seshadri Guha, Peoria, IL (US); Vinay Sikka, Peoria, IL (US); Subbarao Turlapati, Peoria, IL (US)

(73) Assignee: TADA Cognitive Solutions, LLC, Peoria, IL (US)

( * ) Notice: Subject to any disclaimer, the term of this patent is extended or adjusted under 35 U.S.C. 154(b) by 0 days.

(21) Appl. No.: 17/150,695

(22) Filed: Jan. 15, 2021

(65) Prior Publication Data

US 2021/0165816 A1 Jun. 3, 2021

Related U.S. Application Data

(63) Continuation of application No. 16/425,886, filed on May 29, 2019, now Pat. No. 10,909,160.

(51) Int. Cl.
*G06F 16/36* (2019.01)
*G06F 16/18* (2019.01)
(Continued)

(52) U.S. Cl.
CPC ........ *G06F 16/367* (2019.01); *G06F 16/1858* (2019.01); *G06F 16/258* (2019.01); *G06F 16/283* (2019.01)

(58) Field of Classification Search
CPC .... G06F 16/367; G06F 16/258; G06F 16/283; G06F 16/1858
See application file for complete search history.

(56) References Cited

U.S. PATENT DOCUMENTS 5,905,498 A 5/1999 Diament
8,332,526 B2 12/2012 Kruse et al.
(Continued)

OTHER PUBLICATIONS

Salma Najar et al. 2009. Semantic representation of context models: a framework for analyzing and understanding. In Proceedings of the 1st Workshop on Context, Information and Ontologies (CIAO '09). Association for Computing Machinery, New York, NY, USA, Article 6, 1-10. (Year: 2009).*
(Continued)

*Primary Examiner* — Brittany N Allen
(74) *Attorney, Agent, or Firm* — Lee Sullivan Shea & Smith LLP

(57) ABSTRACT

Disclosed herein is new approach for structuring an organization's data, involving at a high level establishing a digital context and populating the digital context with digital content to thereby form what is referred to herein as a digital duplicate. In one aspect, the disclosed approach may be embodied in a computer-implemented method that involves: establishing a data structure comprising (i) a structural context that has at least one data component, where each component of the structural context has associated therewith one or more respective data properties (ii) a semantic context that has at least two data types that further describe individual data properties and; and populating underlying data into an instance of the data structure such that underlying data populated into each respective property of the at least one data component has each of the at least two data types of the semantic context.

25 Claims, 5 Drawing Sheets

(51) Int. Cl.
   *G06F 16/25* (2019.01)
   *G06F 16/28* (2019.01)

(56) References Cited

U.S. PATENT DOCUMENTS

| | | | | |
|---|---|---|---|---|
| 8,429,179 | B1* | 4/2013 | Mirhaji | G06F 16/248 |
| | | | | 707/756 |
| 8,719,299 | B2* | 5/2014 | Voigt | G06F 16/213 |
| | | | | 707/776 |
| 9,038,082 | B2 | 5/2015 | Maes | |
| 9,582,495 | B2* | 2/2017 | Song | G06F 16/36 |
| 10,783,122 | B2* | 9/2020 | Farber | G06F 16/1734 |
| 2008/0294599 | A1 | 11/2008 | Lei | |
| 2009/0160658 | A1 | 6/2009 | Armstrong | |
| 2012/0095973 | A1 | 4/2012 | Kehoe et al. | |
| 2016/0028808 | A1 | 1/2016 | Arthursson et al. | |
| 2017/0185674 | A1* | 6/2017 | Tonkin | G06F 16/367 |
| 2018/0173795 | A1 | 6/2018 | Cobbett | |
| 2019/0108245 | A1* | 4/2019 | Bentley | G06F 16/256 |
| 2020/0012265 | A1* | 1/2020 | Thomsen | G06F 3/0481 |

OTHER PUBLICATIONS

Datta, Shoumen Palit Austin. "Emergence of digital twins." arXiv preprint arXiv:1610.06467 (2016). (Year: 2016).*
Wikipedia, "Semantic Web", https://en.wikipedia.org/wiki/Semantic_Web, retrieved from the Internet on Feb. 14, 2020, pp. 1-15.
Wikipedia, "Web Ontology Language", https://en.wikipedia.org/wiki/Web_Ontology_Language, retrieved from the Internet on Feb. 14, 2020, pp. 1-16.
International Searching Authority, International Search Report and Written Opinion, PCT/US2020/035104, mailed Aug. 27, 2020, 7 pages.

* cited by examiner

DIGITAL DUPLICATE

CROSS-REFERENCE TO RELATED APPLICATION

This application is a continuation of, and claims the benefit of priority under 35 U.S.C. § 120 to, U.S. application Ser. No. 16/425,886, filed on May 29, 2019 and titled "Digital Duplicate," the contents of which are incorporated by reference herein in its entirety.

BACKGROUND

Businesses and other networks have a fundamental need to derive an understanding of their business/network at any moment in time, in order to engage in strategic & operational decision-making.

Overview

Today, this need is served by a range of conventional systems for storing, manipulating, and accessing data. Such systems are generally limited in their scope, flexibility, and ability to integrate with other such systems that exist within a business or across multiple businesses.

Part of this limitation arises from these conventional systems for storing, manipulating, and accessing data being built around specific business functions. As examples, such systems may include a CRM tool, inventory management system, accounting system, enterprise resource planning, payroll tool, among other examples. These systems further suffer from being confined to engaging in specific user functions (e.g., report generation and visualization, data input, etc.) that are associated with those business functions.

Further, "data warehousing" and "business intelligence" systems tend to consume data originating from various sources in a data network, and aggregate and pre-process that data to fit a predefined schema or set of dimensions. As a tool, data warehousing is rigid by virtue of the fact that the dimensions, metrics, aggregation, and delivery models (e.g., dashboards) for the data must be pre-defined prior to utilization. In addition, the data contained within such systems may also be used for the specialized simulation and modeling of specific (narrow) areas of the business (e.g., supply chain modeling, manufacturing planning, financial modeling & forecasting, etc.).

Conventional systems—such as relational databases—are advantageous for vertical scaling (e.g., expanding a data table of 22 columns to billions of records), but tend to be rather limited in terms of horizontal linking and expansion across multiple tables.

In order to address these shortcomings, and to help improve upon these and other problems, the present disclosure seeks to reduce fixed relationships between data tables through the disclosed digital duplicate data structure, which utilizes a dynamic model and method that can be implemented thru a plurality of techniques including dynamic entity relationships. This allows for the digital duplicate to ingest, access data, and adapt to an organization's changes without the burden of redesigning the data system from the ground up, as may be required in conventional data structures and conventional approaches for implementing data storage systems and data structures.

From a user standpoint, conventional data structures and conventional approaches for implementing data storage systems may allow for data to be accessed in response to specific queries as permitted by the foundational design of database structures (e.g., based on requirements analysis and design, as used to design a relational database system). One drawback to this approach, however, is that in order to obtain a desired output from the data storage system (e.g., to obtain a desired query result), the user must have a priori knowledge of the architecture of the data storage system, including an understanding of the data structures utilized in the data storage system. With the approach disclosed herein, there are no such constraints. Indeed, the digital duplicate may replicate the real-world physical reality of the existence of associations between digital records (data) describing physical assets, events and other phenomena, and as such may be configured to provide to users desired outputs without requiring those users to have a priori knowledge of the data storage architecture.

In some respects, the disclosed approaches for establishing new data structures provide other advantages and efficiencies. As one example, relationships in the new data structures can be established using minimal additional logic. Further, data ingestion occurring from multiple data sources can, with the benefit of the present approach for establishing new data structures, result in data that is efficiently synthesized and arranged in the established data structure, helping to ensure it is consistent across an organization's entire data store.

This, in one aspect, disclosed herein is a computer-implemented method that involves: establishing a data structure comprising (i) a semantic context that has at least two data types, and (ii) a structural context that has at least one data component, where each component of the structural context has associated therewith one or more respective data properties; and populating underlying data into an instance of the data structure such that underlying data populated into each respective property of the at least one data component has each of the at least two data types of the semantic context.

In another aspect, disclosed herein is a computing system that comprises at least one processor, a non-transitory computer-readable medium, and program instructions stored on the non-transitory computer-readable medium that are executable by the at least one processor to cause the computing system to carry out the operations disclosed herein, including but not limited to the operations of the foregoing method.

In yet another aspect, disclosed herein is a non-transitory computer-readable medium comprising program instructions that are executable to cause a computing system to carry out the operations disclosed herein, including but not limited to the operations of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

The present disclosure is generally directed to technology to build a "digital duplicate" representing an organization's business operations that offers a unique set of advantages over conventional systems. Specifically, by building a digital duplicate using a new data structure based on the neuro-synaptic model through which humans combine and use information in the brain, the digital duplicate may facilitate a more efficient and dynamic means of storing, retrieving, searching, securing, navigating, and synthesizing the data associated with the business or other network.

When the digital duplicate is populated with the data (embodied as digital content), the digital duplicate may allow for the data to be contextualized in a way that benefits from the efficiencies realized by human cognition. Furthermore, the data may originate from a plurality of sources (e.g., conventional data stores or warehouses) and may be unified and/or aggregated from those distributed sources into the context provided by the digital duplicate.

The disclosed system may be built in network-form, making large-scale multidimensional nodes, associations, and properties of many different data sources and types lightweight in comparison with conventional systems. Notably, conventional systems, such as the semantic web, do not provide for associations to be formed automatically based on semantic alignment between two or more pieces of data. As disclosed, the present architecture employs a semantic data type, among other properties and property types, which allows for associations to be formed between different data from their shared semantic context, automatically, without the association having to be programmed into the system (as it may otherwise be in existing systems, such as those that utilize "triplet" form, like OWL, RDF, etc.). Accordingly, the present disclosure provides a technique that invention allows for rules, logic and associations to be established and utilized around stored data without the need for programmatic logic.

In addition, the introduction of the semantic data type allows for semantically-identical information to be correlated even when different language is used by different users across a network or networks to describe that same information. This ability to correlate information by its semantics enables a wealth of novel functionality relating to data consumption, processing, association, manipulation and use, among others.

I. EXAMPLE SYSTEM ARCHITECTURE

Figure 1:
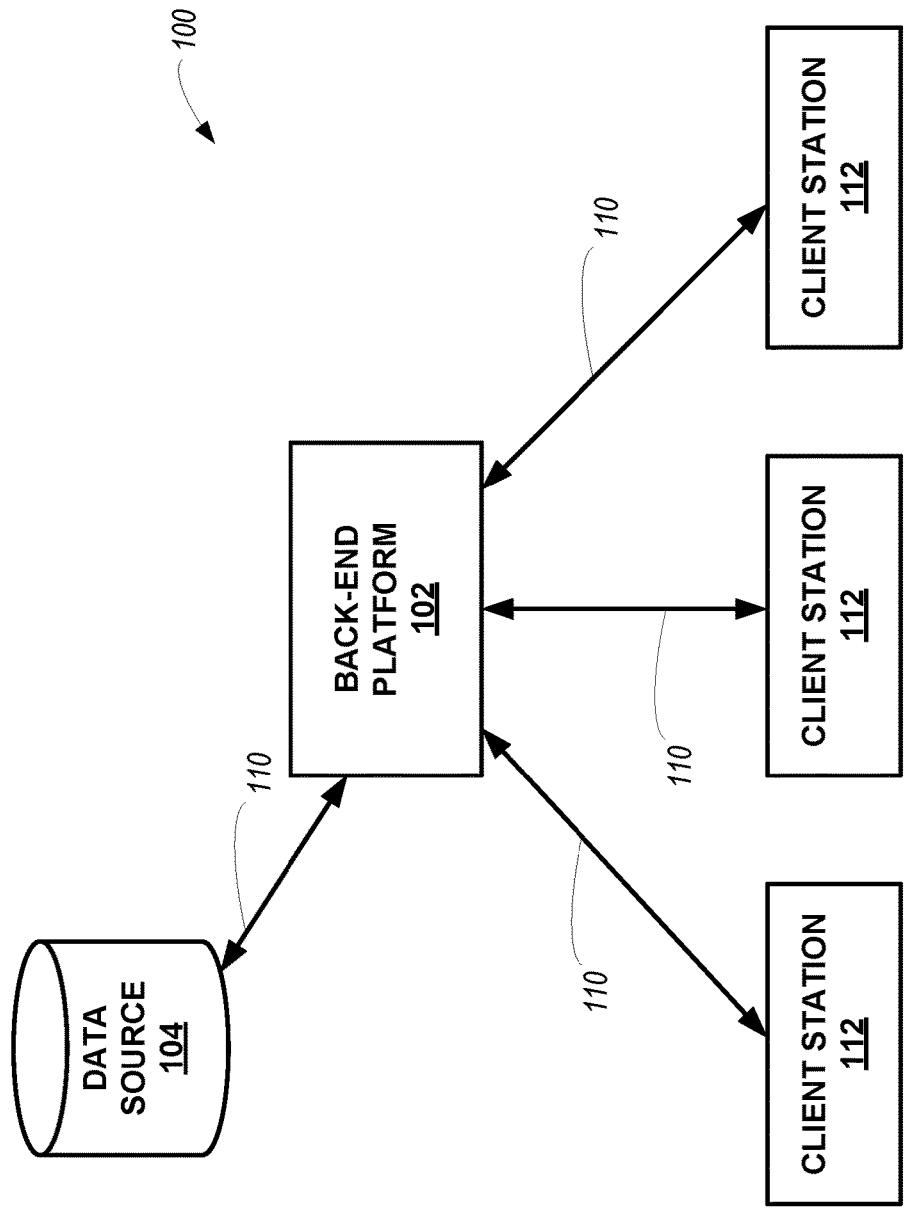
FIG. 1 depicts an example network architecture in which example embodiments may be implemented.

Turning now to the figures, FIG. 1 depicts an example network configuration 100 in which example embodiments of the present disclosure may be implemented. As shown in FIG. 1, network configuration 100 includes a back-end platform 102 that may be communicatively coupled to one or more client stations, depicted here, for the sake of discussion, as client stations 112.

Broadly speaking, back-end platform 102 may comprise one or more computing systems that have been provisioned with software for carrying out one or more of the functions disclosed herein, including but not limited to establishing a digital context and ingesting data to form digital duplicate. The one or more computing systems of back-end platform 102 may take various forms and be arranged in various manners.

For instance, as one possibility, back-end platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates back-end platform 102 may either supply its own cloud infrastructure or may obtain the cloud infrastructure from a third-party provider of "on demand" computing resources, such include Amazon Web Services (AWS) or the like. As another possibility, back-end platform 102 may comprise one or more dedicated servers that have been provisioned with software for carrying out one or more of the functions disclosed herein. Other implementations of back-end platform 102 are possible as well.

In turn, client stations 112 may each be any computing device that is capable of running the front-end software disclosed herein. In this respect, client stations 112 may each include hardware components such as a processor, data storage, a user interface, and a network interface, among others, as well as software components that facilitate the client station's ability to run the front-end software disclosed herein (e.g., operating system software, web browser software, etc.). As representative examples, client stations 112 may each take the form of a desktop computer, a laptop, a netbook, a tablet, a smartphone, and/or a personal digital assistant (PDA), among other possibilities.

As further depicted in FIG. 1, back-end platform 102 is configured to interact with client stations 112 over respective communication paths 110. In this respect, each communication path 110 between back-end platform 102 and one of client stations 112 may generally comprise one or more communication networks and/or communications links, which may take any of various forms. For instance, each respective communication path 110 with back-end platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with back-end platform 102 may be wireless, wired, or some combination thereof, and may carry data according to any of various different communication protocols. Although not shown, the respective communication paths 110 between client stations 112 and back-end platform 102 may also include one or more intermediate systems. For example, it is possible that back-end platform 102 may communicate with a given client station 112 via one or more intermediary systems, such as a host server (not shown). Many other configurations are also possible.

The interaction between client stations 112 and back-end platform 102 may take various forms. As one possibility, client stations 112 may send certain user input related to a digital duplicate to back-end platform 102, which may in turn trigger back-end platform 102 to take one or more actions based on the user input. As another possibility, client stations 112 may send a request to back-end platform 102 for certain data and/or a certain front-end software module, and client stations 112 may then receive digital duplicate data (and perhaps related instructions) from back-end platform 102 in response to such a request. As yet another possibility, back-end platform 102 may be configured to "push" certain types of digital duplicate data to client stations 112, in which case client stations 112 may receive digital duplicate data (and perhaps related instructions) from back-end platform 102 in this manner. As still another possibility, back-end platform 102 may be configured to make certain types of digital duplicate data available via an API, a service, or the like, in which case client stations 112 may receive data from back-end platform 102 by accessing such an API or subscribing to such a service. The interaction between client stations 112 and back-end platform 102 may take various other forms as well.

As also shown in FIG. 1, back-end platform 102 may also be configured to receive digital duplicate data from one or more external data sources 104, such as an external database and/or another back-end platform or platforms. Such data sources—and the data output by such data sources—may take various forms. Further, back-end platform 102 and the one or more external data sources 104 may be configured to interact over a communication path 110, which may take the form or forms discussed above with respect to the other communication paths 110.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING DEVICE

Figure 2:
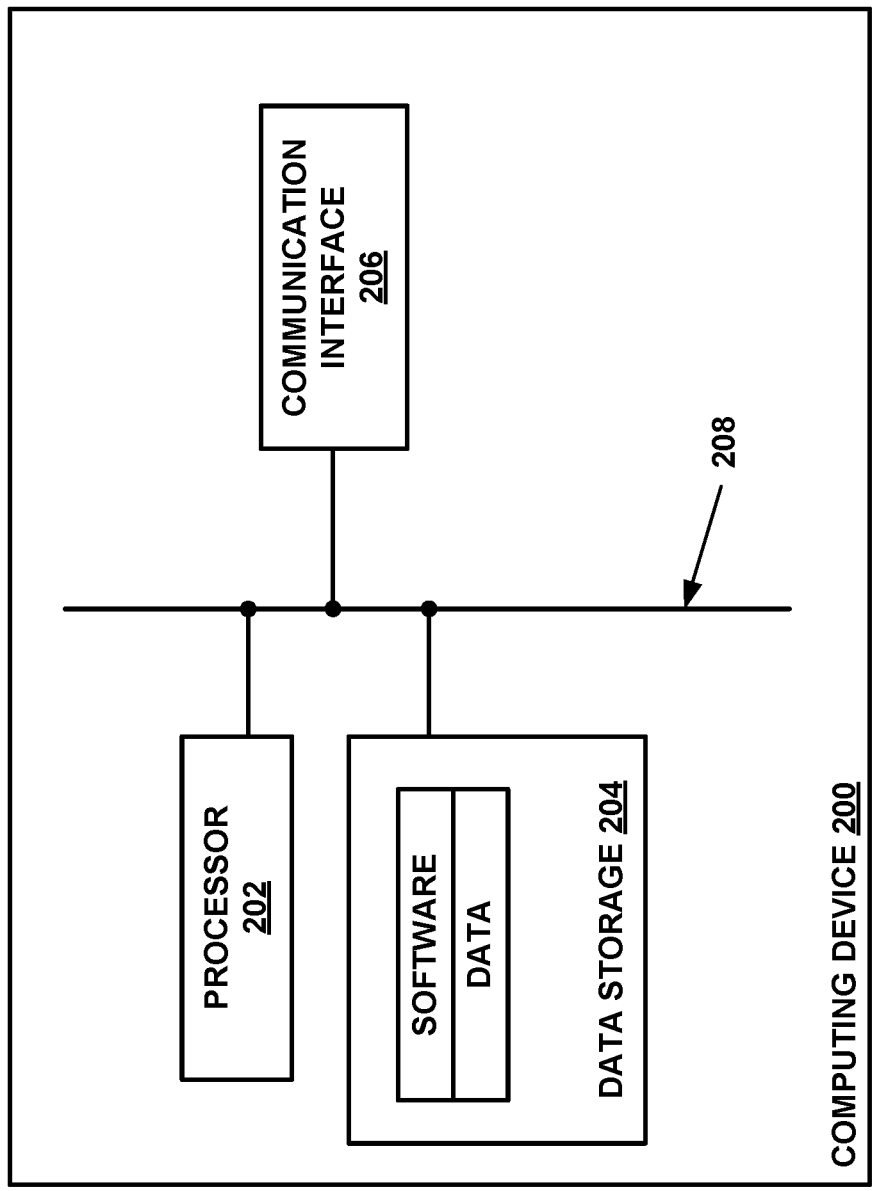
FIG. 2 depicts a simplified block diagram of an example computing device in which example embodiments may be implemented.

FIG. 2 is a simplified block diagram illustrating some structural components that may be included in an example computing device 200, which could serve as, for instance, the back-end platform 102 and/or one or more of client stations 112 in FIG. 1. In line with the discussion above, computing device 200 may generally include at least a processor 202, data storage 204, and a communication interface 206, all of which may be communicatively linked by a communication link 208 that may take the form of a system bus or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the computing device 200 to carry out the operations disclosed herein. These software components may generally take the form of program instructions that are executable by the processor 202 to carry out the disclosed functions, which may be arranged together into software applications, virtual machines, software development kits, toolsets, or the like, all of which are referred to herein as a software tool or software tools. Further, data storage 204 may be arranged to store data in one or more databases, file systems, or the like. Data storage 204 may take other forms and/or store data in other manners as well.

Communication interface 206 may be configured to facilitate wireless and/or wired communication with other computing devices or systems, such as one or more client stations 112 when computing device 200 serves as back-end platform 102, or as back-end platform 102 when computing device 200 serves as one of client stations 112. As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, computing device 200 may additionally include one or more other interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with computing device 200.

It should be understood that computing device 200 is one example of a computing device that may be used with the embodiments described herein. Numerous other arrangements are possible and contemplated herein. For instance, other computing devices may include additional components not pictured and/or more or fewer of the pictured components.

III. DIGITAL DUPLICATE DATA STRUCTURES

As mentioned, the present disclosure is directed to a new approach for structuring an organization's, a business's, or a network's data, which may help to facilitate more efficient access to this data. At a high level, this approach involves establishing a digital context and populating the digital context with digital content to thereby form what is referred to herein as a digital duplicate. Deploying a digital duplicate in practice includes the high-level steps of first creating the digital context, and second adding data to this digital context. The digital duplicate may be kept live or refreshed repeatedly over time by continuously updating the digital context as the organization's, business's, or network's data changes and the digital content as the data and the data sources change. While elements of the digital context and digital content may change, the core data structure of the digital duplicate does not change, allowing the information to remain consistent without having to change the design of the data structure.

Figure 3:
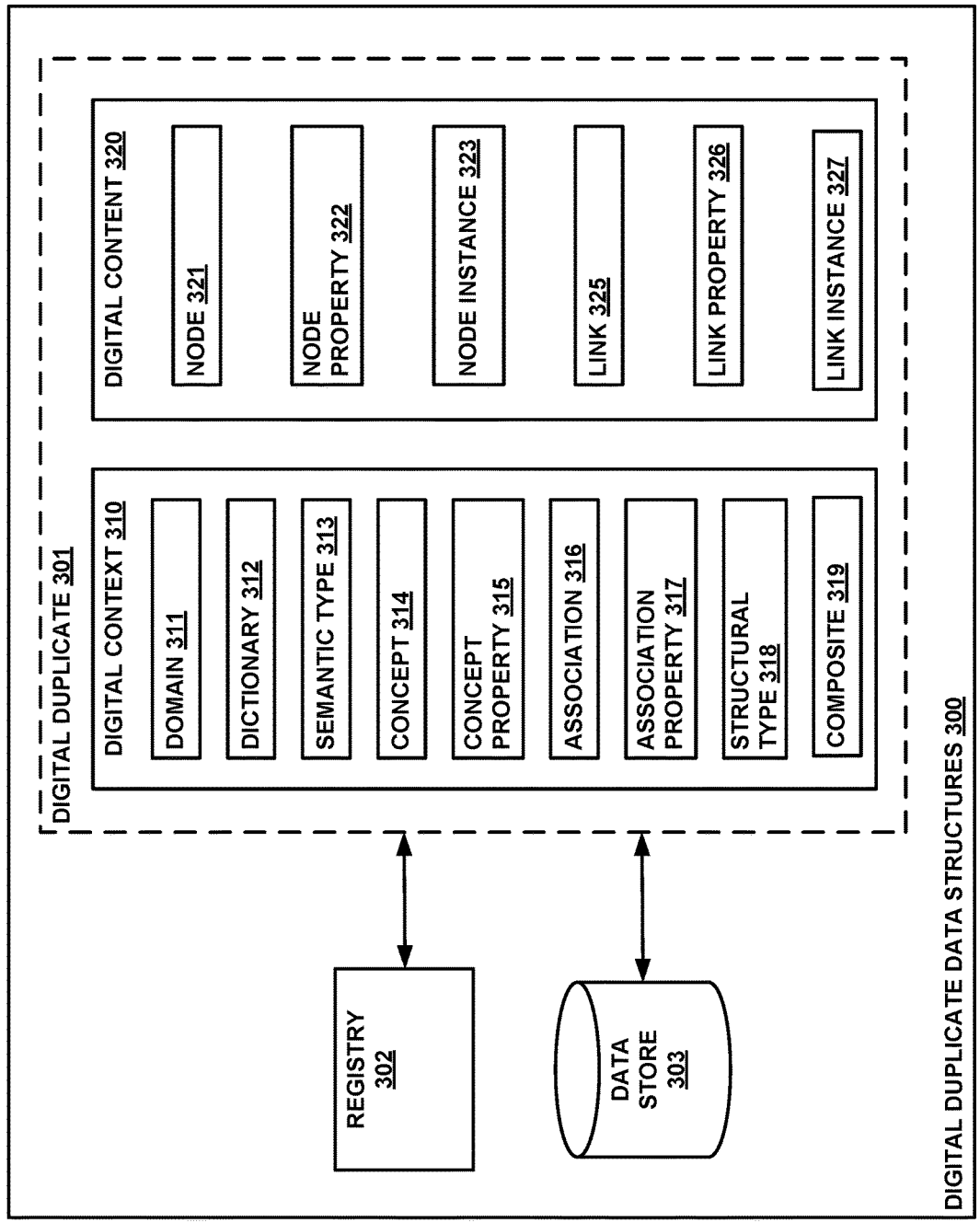
FIG. 3 depicts a simplified block diagram of some example data structures according to example embodiments.

FIG. 3 is a simplified block diagram, illustrating an example digital duplicate data structure architecture 300 according to an example embodiment of the present disclosure. At a high level, and as depicted, digital duplicate data structures 300 may include a digital context 310 and digital content 320, which together form what is referred to herein as an instance of a digital duplicate 301. The data structures 300 also include a registry 302 and a data store 303. These various data structures are described herein in further detail.

A. Digital Context

At a more specific level, but still by way of example, FIG. 3 depicts an example architecture diagram illustrating certain data structures included within digital context 310. As mentioned, digital context 310 is a data structure that generally comprises a network of individual data components. This network of data components may include structural context components and semantic context components. These components may be stored in data store as will be described further herein.

Turning first to the structural context components, these structural context components may generally describe how the data is structured and stored in the digital context. In one implementation, the structural context components may include conceptual components 314 (sometimes referred to herein as concepts) and associative components 316 (sometimes referred to herein as associations). And these components may have one or more respective properties 315, 317. These components may be designed to hold data that describes various aspects about how an organization's information is structured within the digital duplicate 301 as well as how this information relates to itself. Although these components are depicted as blocks in a simplified block diagram, it should be understood that the underlying data represented by these blocks may be stored in an appropriate storage location of data store 303, which may at time be referred to herein as a directory.

A conceptual component 314 may generally be a data structure that is designed to hold data that describes one aspect of an organization's business. To illustrate with an example for a particular organization in the medical services industry, one example conceptual component may be a "physician" component where this conceptual component may be designed to hold data that describes the physicians that are employed by the particular organization. To this end, the "physician" conceptual component may include various properties 315 for holding such data, including a "Last Name" property, a "First Name" property, a "Specialty" property, a "Telephone Number" property, and/or a "Years in Service" property, among other examples.

In some cases, properties may be shared across multiple conceptual components. For example, the "specialty" property may be shared across multiple "Physician" conceptual components and/or the "Clinic" conceptual component. In situations in which a property is widely shared across multiple conceptual components, the digital context may be configured to promote the "specialty" property from a property to a separate concept. This may be accomplished without changing the underlying data structure but rather reconfiguring it. This ability of the neuro-semantic network to adapt and learn as the organization changes makes it a scalable and learning model. The method provides for the ability to promote properties into concepts or to collapse them into concepts and associations to best represent the current structure of the organization.

Another example conceptual component 314 may be a "patient" component where this conceptual component may be designed to hold data that describes the individuals that are patients of the various physicians who are employed by the particular organization. To this end, the "patient" conceptual component may include various properties 315 for holding such data, including a "Last Name" property, a "First Name" property, a "Home Address" property, and/or a "preferred Payment Method" property, among other examples.

Yet another example conceptual component 314 may be a "clinic" component where this conceptual component may be designed to hold data that describes the various clinical facilities utilized by the particular organization. To this end, the "clinic" conceptual component may include various properties 315 for holding such data, including a "Clinic Name" property, an "Address" property, a "Services Offered" property, and/or a "Capacity" property, among other examples.

As depicted, another type of structural component of the digital context may be an associative component 316. An associative component is similar to a structural component in that it is designed to hold data that describes one aspect of an organization's business. But more specifically, the associative component is also designed to hold data that (i) describes an aspect of the organization's business such as an activity or a metric and (ii) relates together to two or more conceptual components 314. As an example, one example associative component for the particular organization in the medical services industry may be a "visit" component designed to hold data that describes a particular patient's visit to a particular physician at a particular clinic and is thus associative of multiple conceptual components, including the example "physician," "patient," and "clinic" structural components described above. To this end, the "visit" associative component may include various properties 317, including a "Date of Visit" property, a "Duration of Visit" property, "Billed Value of Visit," and/or a "Diagnosis of Visit" property, among other examples.

As mentioned throughout the examples given above, structural context components, including both conceptual components and associative components, include various properties 315, 317 for holding certain specific descriptive data for the structural context component. In some implementations, each individual property of a given structural context component may be described by a particular combination of a structural data type 318 and a semantic data type 313, which may thus form a semantic component.

Generally, a structural data type 318 applied to information is data that describes how the information is stored within the system. Many different structural data types are possible. As one example, a structural data type may take the form of a "temporal" data type, under which a "Years in Service" property may fall. As another example, a structural data type may take the form of a "spatial" data type, under which a "Clinic Address" property may fall. As another example, a structural data type may take the form of a "physical" data type, under which a "Clinic" and the "Clinic Name" property may fall. As another example, a structural data type may take the form of a "Personal" data type, under which a "Last Name" data type may fall. As another example, a structural data type may take the form of a "Quantitative" data type, under which a "Billed Value of Visit" property may fall. As another example, a structural data type may take the form of a "Categorical" data type, under which a "Specialty" property may fall. It should be appreciated that other examples may be possible as well.

Generally, a structural data type helps define how data is managed, indexed, and stored for all similar properties in the network. Properties with common structural data type may use common data structures to store and retrieve data across a digital duplicate and provide an efficient way to store, access and relate data; allowing for unique computations; and provide better methods to access, resolve and compare similar data. For example, all "temporal" data types may share or "index" to a common timeline data structure that allows independent events like a sale event and a marketing discount that happened during the same month without having to explicitly compare data. This provides an ability to not only perform unique computations and analysis on properties with similar structural data like "same month," or "same quarter," but also compare financial results of two unrelated companies for the same quarter even though they belong to different business networks because they use the same temporal data type. In another case, if two separate networks provide the population and economic data for the same spatial data type (such as a zip code), it allows one to overlay and contrast population and GDP for the same zip code with minimal effort. Multiple similar storage and advantages can be added to across all shared structural data types by creating a shared structural data type and storage model across properties in a network.

Structural data types like "temporal," "spatial," "personal," or "organizational" may allow data and methods to be shared across one or more properties in a network or across whole networks using a common data structure like a shared timeline, time resolution, or temporal methods; while semantic data types (discussed below) allows for data and methods to eb shared across a network using common meaning. Shared structural data types may also have shared resolution and absolute values. For instance, "February 2015" will have a resolution of 1 day and may be a delivery date to a customer or the start date of an employee. This allows shared computations like "Start Month" or "Delivery Month" to be performed.

As also indicated, each property may also have a semantic data type 313. Generally, a semantic data type applied to underlying information is data that describes what the information means. A semantic data type may have various aspects that facilitate describing what the information means. One aspect that a semantic data type may have is called a primitive data type. A primitive data type may describe the general form of the information. Example primitive data types may include "integer," "Boolean," "string," "float," etc. Another aspect that a semantic data type may have is a pointer that points to a particular function that may be associated with the information. This pointer may be stored in the dictionary entry 312 for the particular semantic data type and may point to various kinds functionality. As one example, the pointer may point to a web method for utilizing the underlying information. A web method may be any operation or set of operations embodied in a web service, API, or the like. For instance, one web method may be a "mailto:EmailAddress" web method that refers to a web method that causes an email client to be invoked, generate a new email message, and populate the "To:" field with the email address represented by the data variable "EmailAddress." Other web methods are possible as well.

Another example of a function to which a pointer may point is mathematical operation performed using the underlying information represented by the semantic data type. For instance, one type of mathematical operation for a "date of birth" semantic data type may be an age computation function. With such a function, the system may compute the age of an individual represented by the underlying date of birth information by, for instance subtracting the "date of birth" date from "current date" data to arrive at "age" data.

Another type of mathematical function for a "price per unit" semantic data type may be a total price aggregation function. With such a function, the system may aggregate all of the data values from various "price per unit" data types to arrive a total price value. Such a function may be useful in situations where a customer is purchasing products or services in a single order that stems from two or more aspects of a business, which may not have aggregated their data systems in advance. Applying the "price per unit" semantic data type (or, in other examples, a similar-functioning semantic data type) serves to link the pricing across what may be disparate aspects of the organization and/or disparate data systems.

Another type of mathematical function for a "lead time" semantic data type may be a lead time aggregation function. A "lead time" semantic data type may be associated with a product, component of a product, subassembly, construction project, etc. With such a function, when a customer purchases multiple products at once, an aggregation function may be executed in which the system may automatically populate "lead time" data by selecting the individual lead time field for each of the purchased products that has the greatest lead time value. In cases in which a product may not have a lead time associated with it, the lead time of each subassembly or component that makes up the product may by summed to approximate the total lead time of the product.

In one example, during data ingestion, the system may capture various data fields for an order, including a "deliveryDate" field for describing the delivery date of an order, an "orderDate" field for describing the date of the placement of the order, and a "deliveryTime" field for describing the time taken for the order to be fulfilled after the product is fully manufactured and stocked in inventory, all of which may be specified by various a logistics or fulfillment systems. At this stage, the system may compute the actual lead time of the product to be the function of (deliveryDate-orderDate)—deliveryTime. Therefore, in the case where a product is not built before it is ordered (as is common in the heavy equipment industry, for example) lead time may be a residual value, as calculated above. Once lead time is known, the system may then engage in a function that compares the actual lead time with the approximated lead time, which may be made possible by the existence the "lead time" semantic data type being used across multiple business systems that is semantically distinct from a "delivery time" type. A further function may add an "error" to the function for computation of approximated lead times for all other products, which in turn may propagate the new calculation of approximated lead times throughout the digital duplicate instantaneously. In this way, the system may engage in a kind of machine learning.

Another example of a function to which a pointer may point is a linking function that may operate to link two or more semantic data types together and form a new property of an associative structural component. As one example of this, a distance function may link together an "address" property of a "patient" conceptual component and an "address" property of a "clinic" conceptual component and computes the distance between these two addresses. The function may then save this distance as a new property of a new associative component.

Yet another example of a function to which a pointer may point is a semantic search function. With such a function, a search may be executed on a given semantic data type, which may retrieve data of the same semantic type from other areas of the organization or other network.

To help illustrate, consider an example in which respective digital duplicates have been established for different aspects of an organization. Each such digital duplicate will have its own set of data components stored separately from the data components of the other digital duplicates. In a situation in which a user desires to know all employees that share duties or interact across the organization's departments, a semantic query can be issued on an "Employee" semantic data type. In the context of the present disclosure, such a semantic search may return all data objects that are based on this semantic type, regardless of the content, format, or location of the data. In this way, the semantic search unifies various disconnected digital representations. With conventional approaches, by contrast, a typical search would fail here, because the data may be spread out across multiple different databases and arranged in multiple tables; and as such, any query would need to account for these multiple databases and the various tables.

Considering another example, say a user desires to know all entities (e.g., dealers, customers, vendors, employees, etc.) having a specific area code. In the context of the present disclosure, the user could issue a single query on a "Phone No." data type for the specific area code of interest. Such a query would return all data objects having the specific area code of interest no matter the location or format of the data. By contrast, with a conventional approach, a user may need a deep understanding of the organization's data storage structure in order to carry out this query. For instance, the user may need to know what table the employee records are stored in and what field and what format the phone number data is stored in. Likewise, the user may need to know this same information for the dealer records, the customer records, the vendor records, etc. Each additional storage location may add complexity to the query. And to the extent that the data is stored in disparate data stores (such as one data warehouse for employee records and another data warehouse for vendor records), then the user may need to issue separate queries for each such disparate data source further compounding the complexity and vulnerability for user error. Thus, with the benefit of the present disclosure, it should be understood how the semantic data type provides for more efficient data retrieval, among other advantages.

In some embodiments, user interface elements presented by one or more computing devices disclosed herein (e.g., client stations 112) may reflect semantic data types with specific graphical elements, such as icons. As one example, on a user interface that is displaying multiple semantic data types for an organization, the user interface may display a telephone icon adjacent to data that is of a "phone number" semantic data type, and/or a map icon if the data is of an "address" semantic data type, although other examples are possible. It should be understood that the functions disclosed herein are merely examples, and that in other implementations, other functions may be possible as well.

Depending on the organization, semantic data types can be arranged into various semantic groups. A semantic group is generally a set of one or more semantic data types that are relevant to a particular categorical aspect of the organization. For instance, example semantic groups for an organization may be "Financial & Accounting," "Production & Manufacturing," "Purchasing," and/or "Logistics." In this way, an organization may arrange the semantic data types into groups that are reflective of the organization's operating departments or sectors. Thus, the "Financial & Accounting," semantic group may have semantic data types that refer to aspects of the organization's own financial & accounting department, the "Production & Manufacturing," semantic group may have semantic data types that refer to the aspects of the organization's own production and manufacturing operations, etc. As such, these semantic data types may more accurately describe the organization's own business operations and may thus be more useful to the organization.

Semantic data types may provide various advantages to organizations who utilize the digital duplicate schema set forth in FIG. 3 and generally described herein. As one advantage, the semantic data type 313 may serve to discriminate between (i) human language used to describe an aspect of the organization's operations (which can be stored as the name of a property, in one embodiment) and (ii) the underlying meaning of the human language used to describe the aspect of the organization's operations (which can be stored as the semantic data type, in one embodiment). This discrimination may thus allow for properties in the digital duplicate to be unified by their underlying meaning (i.e., unified by their semantic data type) even when the human language used to describe them (i.e., their property names) may not be the same.

More particularly, but still by way of example, the digital duplicate architecture 300 encourages this unification by having data sets that are consistently accurate and complete because no data is mismatched within a given context. To illustrate, if one property is called "Digits," and another property is called "Phone No." but these properties refer to the same thing, they both may be pulled into a report, a visualization, a computation, or used in some other way by the computing system when the digital duplicate calls for the semantic data type 'Telephone Number' within a given context. This may be accomplished through an arrangement where "Telephone Number" is a semantic data type that is shared by both the "Digits" and "Phone No." properties. In this way, the semantic data type may be said to "unify" two (or more) properties by these properties' underlying meanings.

Unification may also allow for functions to be associated with different properties of the same semantic data type. To illustrate, as indicated above, "Digits" and "Phone No." may be two different properties that share the same semantic data type "Telephone Number." Therefore, both "Digits" and "Phone No." may have a pointer that points to a "Make-Call" function, which is assigned to these properties by virtue of their shared semantic data type.

Unification may also occur by enriching the structural context of the digital duplicate as a result of automating through-computation of additional properties based on the semantic data type(s) of the originating properties and the functions available for the semantic data type(s). To illustrate using the example from above, the function for computing "Age" from the "Date of Birth" semantic data type is a form of unification because "Birth Date" and "Date of Birth" may be distinct properties in the digital duplicate but share the same semantic data type: "Date of Birth." Other examples of how the digital duplicate architecture results in unification are possible as well. The combination of the concept (node) or association (link) that describes a property in combination with a semantic data type (and in many cases a structural data type) individually and combined also create a strong representation of the digital context. When combined, they provide not only a simple way to locate every piece of data in the business network, and to locate a relative position of the data to other pieces of data for navigation and comparison, but also may provide meaning to the data and structure for storage. Once combined, these data structures create ways to simply and efficiently create, manage, and navigate data in a business or network using the digital context.

As also depicted in FIG. 3, digital context 310 may contain a composite structure 319. A composite structure 319 may contain one or more indications of sets of concepts and associations that represent various aspects of an organization. One type of composite structure may be a layer of concepts and associations. The concepts and associations that comprise a layer may represent similar aspects of the organization. In one example, an organization in the medical services industry may have a "pharmaceutical" layer that comprises concepts and associations related to any pharmaceutical aspects of the organization, such as pharmacy employees, pharmacy inventories, and/or an employee layer that comprises concepts and associations related to employees across all departments. Another type of composite structure may be a realm of concepts and associations. The concepts and associations that comprise a realm may represent aspects of the organization that are grouped on a broader level. For instance, a large organization that is made up of or owns several smaller businesses, this organization may have a realm that comprises all the concepts and associations for one entire business and a realm that comprises all the concepts and associations for another entire business. Yet another type of composite structure may be an insight. The concepts and associations that comprise an insight may represent collections of concepts and insights that have been automatically identified by the system as having some threshold number of relationships. The system may identify such insights when certain patterns develop in the organization's digital context (e.g., a threshold number of associations between various concepts, and/or a threshold number of shared properties between multiple concepts or associations), and in this may be identify to users unique aspects of the organization's operations. Other examples of layers, realms, and insights are possible as are other types of composite structures.

B. Digital Content

As also depicted in FIG. 3, the digital duplicate 301 includes digital content 320. Generally, digital content 320 is the underlying data that populates one or more instances of the framework for the digital duplicate (i.e., the digital context 310) described above. Such digital content may comprise data that may be ingested into the system from one or more data sources, such as business systems (e.g. CRM systems, ERP systems, POS systems, accounting software, etc.), enterprise data stores, data warehouses, data lakes, operational data stores, as well as any other type of kind of databases or data store, such as data inputted by a user, data mined from research reports, among other examples.

This underlying data may be either static data, data updated in a batched manner, such as on a periodic or aperiodic refresh cycle, or data updated in real-time or near real-time (e.g., data provided to the system in the form of a data "stream", which may or may not be buffered to align with the update frequency of the Digital Duplicate's data ingestion method). Other examples of data ingestion may be possible as well.

As depicted, digital content may generally be comprised of links and nodes. In particular digital content 320 may include node data 321, node properties 322, and node instances 323. Further, digital content 320 may also include link data 325, link properties 326, and link instances 327.

As a general matter, node data 321 and link data 325 may include underlying instances of an organization's information that populates a digital context schema, examples of which have been described above. Node data 321 in particular may include the underlying information that populates the conceptual components of the digital context. Referring back to the examples described above, one example conceptual component may be a "physician" component where this conceptual component may be designed to hold data that describes the physicians that are employed by a particular medical services organization. Node data 321 may thus include underlying organization information for the "physician" component, such as individual instances 323 of particular physician information. Thus, for each instance of information that populates the "physician" conceptual component, node data 321 may include a corresponding node. The underlying information within each respective node may be arranged into node properties 322 in accordance with the property structure defined by the conceptual component. For instance, one "physician" node may include node property data "Smith" for the "Last Name" property of the conceptual component, "John" for the "First Name" property of the conceptual component, "Pediatrics" for the "Specialty" property of the conceptual component, "555-867-5309" for the "Telephone Number" property of the conceptual component, and "30" for the "Years in Service" property of the conceptual component, although other examples are possible.

Similarly, link data 325 may include the underlying information that populates the associative components of the digital context. Referring back to the examples described above, one example associative component may be a "visit" component where this associative component may be designed to hold data that describes a particular patient's visit to a particular physician at a particular clinic. Link data 325 may thus include underlying organization information for the "visit" component, such as individual instances 327 of particular visit information. Thus, for each instance of information that populates the "visit" associative component, link data 325 may include a corresponding link. The underlying information within each respective link may be arranged into link properties 326 in accordance with the property structure defined by the associative component. For instance, one "visit" link may include link property data "Jan. 2, 2020" for the "Visit Date" property of the associative component, "1 hour" for the "Duration of Visit" property of the associative component, and "$100" for the "Billed Value" property of the conceptual component, although other examples are possible.

C. Storage Schema

The network of individual data components described above may be stored in one or more data stores 303 in various ways. The structure of the digital context and well as the storage schema, as described herein, allows for network traversal as well as semantic searches (described above) while querying for data. As a result of traversal of the "data network," subsets of the data can be efficiently retrieved and presented to one or more users. Data stores 303 may take the form of one or more of SQL Server, Oracle, Mongo DB, or other storage technologies.

As one example of the various ways in which the individual data components may be stored in data stores 303, relationships between conceptual components 314 and associative components 316 may be stored using what are referred to as unique identifiers ("UIDs"). In this way, each element of each instance of the digital duplicate 301 may have an associated UID (which, depending on the situation, may or may not be unique). As outlined above, the various elements that may have a UID assigned thereto may be (i)

domains, (ii) subdomains, (iii) directories, (iv) conceptual components, (v) associative components, (vi) properties, (vii) dictionaries, (viii) semantic groups, and/or (ix) semantic data types. In some implementation, a UID may take the form of a URI (Uniform Resource Identifier), or any other standard identifier type, among other examples.

As an illustrative example the "Patient" conceptual component may exist in data storage 303 in, for instance, table form with underlying digital data populated for the component in the form of [P1, P2, P3, etc.]. Likewise, the "Physicians" conceptual component may exist in data storage 303 in, for instance, table form with underlying digital data populated for the component in the form of [H1, H2, H3, etc.]. Likewise, the "Clinics" conceptual component may exist in data storage in table form with underlying digital data populated for the component in the form of [C1, C2, C3, etc.].

Using this arrangement, the "Visits" associative component may accordingly exist in data storage 303 in, for instance, table form with underlying digital data populated for the associative component in the form of a table containing intersecting data from the other related conceptual components. As an example, one specific instance of the "Visit" component may have data that takes the form [P1, H3, C2], where this instance describes a visit that took place by patient "P1" who was treated by physician "H3" at clinic "C3," although other combinations are be possible.

Reciprocal data tables may be stored in data storage 303 as well. A reciprocal table may serve to identify, for the conceptual component data, whether and to what extent there is associative component data that relates in some way to the conceptual component data. Using the examples set forth above, the "Patient" conceptual component discussed above may contain a reciprocal table that intersects its dependent structural components for each instance of a "Patient," where one instance for Patient "P1" may take the form of [V1, H3, C2]. Other examples of reciprocal tables may be possible as well.

In this way, the data defining the schema for the digital duplicate may be embodied as a "data network" or form of neurosynaptic storage of information, where associative information (such as that described above) is stored at the intersection point of the structural components. Each instance of such data tables for corresponding "Visits," "Patients," "Physicians," and "Clinics" (as examples) may be created from source data by an organizer part of the data ingestion method, described below. This provides certain advantages over traditional data storage models, such as relational models that use fixed relationships between data. As one advantage, the present technique uses a single, atomic template to implement each structural association and its corresponding components in the appropriate storage model. As such, this technique allows for dynamic expansion to create as many associations as may be desired to represent the desired comprehensive network. In comparison to NoSQL databases that store entities as collection of key-value pairs and allow for each record to have a variable structure in each table, or graph databases that use key-value pairs to store relationships between two values, the digital duplicate architecture allows information to be stored within a flexible neurosynaptic data structure to describe the data using the directory, dictionary, and the structural data types. This provides dramatic flexibility both to store and locate data accurately and to capture additional business information within the network.

Further, the data defining the schema for the digital duplicate can be stored in data storage 303 via tables that represent all relationships that comprise the network of components (referred to herein as the "Digital Context" 301). And in this way, data ingested can be placed within this digital context 301. In some implementations, this technique may provide for traceability between data sources and its corresponding data context using UIDs for each source of data and for each contextual element. As an example of this, a patient's "First Name" data element may reference the UID of the structural elements corresponding to this data element (for example, the patient's associated visits) and vice-versa.

The system may be further configured to store a particular digital context 310 and/or the underlying digital content 320 for the particular digital context with an indication that the particular digital context and/or the underlying digital content belongs to unique domain 311 or subdomain. For instance, a unique domain (and/or subdomain) may be established for each instance of the digital duplicate and may be stored in a registry 302. A registry 302 may contain (a) a list of domains and (b) a list of all subdomains that exist within each domain. For instance, returning to the example organization in the medical services industry, the list of domains may contain a domain indicator (e.g., a URI) that is specific to this organization. The domain indicator may thus represent all the data that is stored as the digital content for a digital duplicate related to this organization. Within each domain, there may be one or more subdomains for individual data contexts for the organization. For instance, within the domain for the example organization, in the medical services industry, there may be a subdomain for "Purchasing," and a subdomain for "Marketing," among other examples. This, the list of subdomains may contain subdomain indicators (e.g., URIs) that identify these subdomains.

A registry 302 may also contain data describing locations and identifiers of authentication security services for users accessing data within a given domain. For instance, domains and subdomains may be private (accessible only to users within an organization), and as such may contain such authentication data that serves to describes the various user that have appropriate permissions to access the given domains and/or subdomains. Domains and subdomains may also be public, and therefore accessible to any users or systems outside of an organization. Other examples of data that may be stored in the registry are possible as well.

As explained, the schema for one instance of a digital context may be stored in or with what is referred to as a "dictionary" 312. In this way, a single dictionary 312 may store data that describes the digital context 310 for one specific organization. The system may thus store multiple dictionaries, with one dictionary being stored for each specific organization that utilizes the system to create and store an instance of a digital duplicate 301. In some implementations, however, dictionaries may be shared between domains and/or subdomains. For instance, if a first organization in the medical services industry has already established a dictionary that stores its schema data describing its digital context, then a second similar medial services organization may benefit from using this same dictionary already established for the first organization. In this way, a common set of semantics may be used across organizations in the same or similar industries.

The digital duplicate may be stored via data store 303 using any appropriate data storage technology, including by way of example, graphical databases, relational databases (SQL, Oracle), in-memory data storage, as well as other types of storage. Digital duplicate information may be stored in two or more such database technologies for redundancy and/or performance purposes.

In some implementations an index file may be used as a separation of concerns measure. For instance, an index file that may contain data keys may reside in one location and the digital duplicate data may reside in another, perhaps remote, location. In this way, a set of semantic services may be employed to store and retrieve data specific to the underlying digital duplicate data by first accessing the data keys and then using those data keys to identify and access the location of the underlying digital duplicate data.

IV. EXAMPLE OPERATIONS

Example operations that may be carried out by one or more computing devices running the disclosed software tool are discussed in detail below. For purposes of illustration only, these example operations are described as being carried out by a computing device, such as computing device 200 (FIG. 2), which as described above, may serve as one or more of client stations 112 (FIG. 1) and/or back-end platform 102 (FIG. 1). In this respect, it should be understood that, depending on the implementation, the operations discussed herein below may be carried out entirely by a single computing device, such as one or more of client stations 112 or by back-end platform 102, or may be carried out by a combination of computing devices, with some operations being carried out by back-end platform 102 (such as computational processes and data-access operations) and other operations being carried out by one or more of client stations 112 (such as display operations and operations that receive user inputs). However, other arrangements are possible as well.

To help describe some of these operations, flow diagrams may also be referenced to describe combinations of operations that may be performed by a computing device. In some cases, a block in a flow diagram may represent a module or portion of program code that includes instructions that are executable by a processor to implement specific logical functions or steps in a process. The program code may be stored on any type of computer-readable medium, such as non-transitory computer readable media (e.g., data storage 204 (FIG. 2)). In other cases, a block in a flow diagram may represent circuitry that is wired to perform specific logical functions or steps in a process. Moreover, the blocks shown in the flow diagrams may be rearranged into different orders, combined into fewer blocks, separated into additional blocks, and/or removed, based upon the particular embodiment. Flow diagrams may also be modified to include additional blocks that represent other functionality that is described expressly or implicitly elsewhere herein.

A. Digital Context Creation

Figure 4:
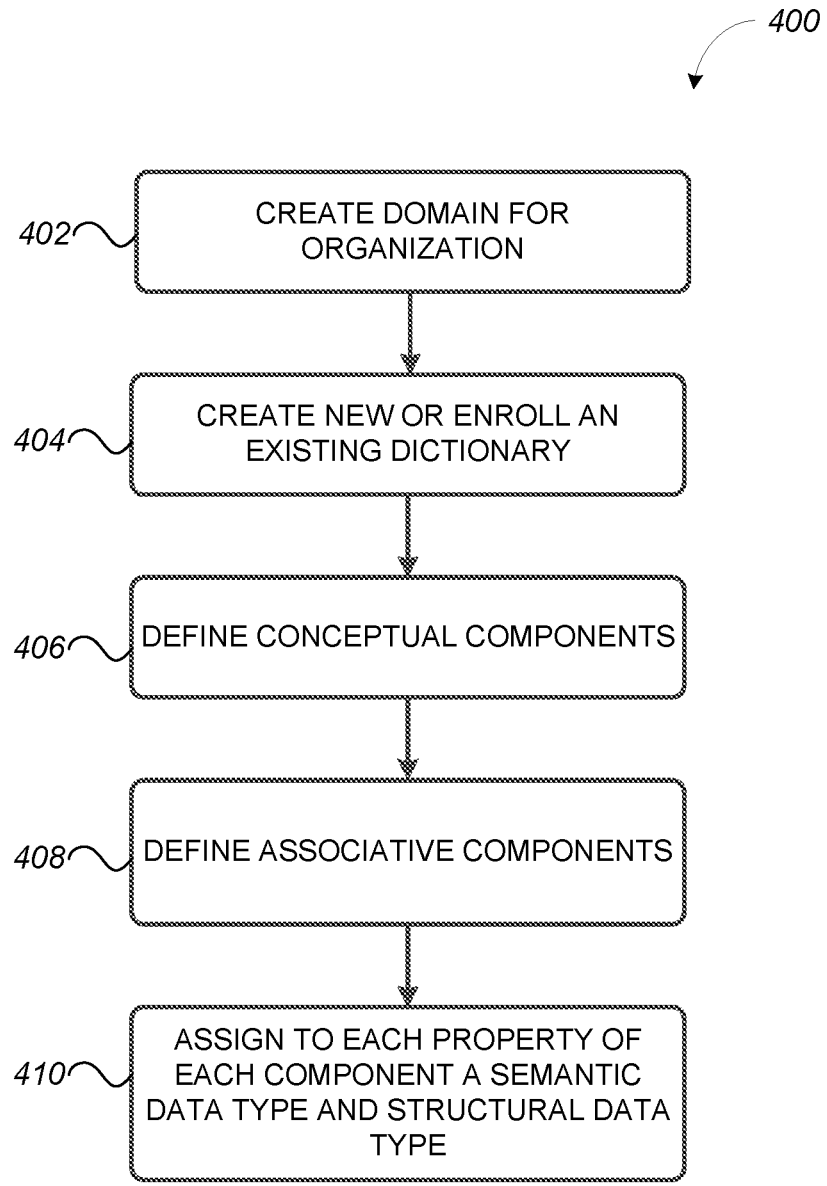
FIG. 4 is a flow diagram depicting example operations that may be carried out in accordance with one or more embodiments of the present disclosure.

To help illustrate how a computing system (such as back-end platform 102) may establish a digital context, such as digital context 310, reference will now be made to flow diagram 400 of FIG. 4, which depicts an example process for stabling a digital context carried out in accordance with the disclosed digital duplicate technology.

Turning first to block 402, the computing device may first create a domain for a particular organization. As indicated a domain may serve to identify that a particular set of data is specific for a particular organization. To this end, as part of creating a domain for a particular organization, the computing device may also assign a unique identifier (e.g., a URI or the like) for the domain. As also indicated, domains may include zero or more subdomains for describing additional aspects of an organization's business, such as individual operational departments. Thus, as part of creating the domain, the computing device may create one or more subdomains, as desired, and assign unique identifiers to these subdomains (e.g., URIs or the like).

The computing device may create a domain by, for instance, receiving a user input or a set of user inputs from a client station 112. For instance, the computing device may cause a client station 112 to present a graphical user interface (GUI) of some kind, through which a user may provide a user input or a set of user inputs providing information or instructions to facilitate the computing device creating a domain for a particular organization. As one example, a user input may provide the computing system with various information to create the domain, such as the name of the domain, the name of the organization, and the name of any subdomains, among other examples. As another example, the user input may provide an indication and/or instructions for how the computing device should retrieve from one or more external data sources various information to create the domain. For instance, such an indication or instructions may include an identification of one or more external data sources at which domain information can be retrieved. In some implementations, a combination of user inputs may be provided to the computing device to facilitate creating the domain, including one or more user inputs that may provide the computing system with various information to create the domain, such as the name of the domain, the name of the organization, and the name of any subdomains, and one or more user inputs that may provide an indication and/or instructions for how the computing device should retrieve from one or more external data sources various information to create the domain. Other examples of user inputs may be possible as well.

Turning next to block 404, the computing device may create or enroll an existing dictionary for the organization. As indicated, a dictionary may store data that describes the digital context for one specific organization. Depending on the implementation, a dictionary may be created for an organization from scratch, such as by engaging in one or more functions described by the remaining blocks in the flow diagram 400, or all or part of a dictionary may be enrolled based on a dictionary for an existing organization.

In the case that all or part of a dictionary will be enrolled based on a dictionary for an existing organization, the computing device may do this by selecting the organization or organization from which all or part of a respective dictionary will be enrolled, and then selecting all or part of the dictionary for the selected organization. To facilitate, the computing device may cause a client station 112 to present a GUI of some kind, through which a user may provide a user input or a set of user inputs providing information or instructions to facilitate the computing device selecting the organization or organization from which all or part of a respective dictionary will be enrolled, and then selecting all or part of the dictionary for the selected organization. As one example, the client station 112 may present a selection menu presenting possible organizations that may be selected, and once an organization is selected, the client device 112 may present a selection menu to select that presents possible dictionary entries for that organization that may be selected. Other ways to enroll all or part of an existing dictionary may be possible as well.

In the case that a new dictionary for an organization will be created from scratch, the computing device may do this in various ways. As one possibility, the computing device may cause a client station 112 to present a GUI of some kind, through which a user may provide a user input or a set of user inputs providing information or instructions to facilitate the computing device creating a dictionary. Such a user input or user inputs may be provided as described in the following blocks.

For instance, at block 406, the computing device may define the conceptual components and properties thereof. The computing device may define the conceptual components in various ways. As one possibility, the computing device may cause a client station 112 to present a GUI of some kind, through which a user may provide a user input or a set of user inputs providing information or instructions to facilitate the computing device defining the conceptual components. As one example of this, the client station 112 may present a selection menu presenting possible conceptual components and possible properties that may be selected. As another example, the computing device may cause a client station 112 to present a GUI with one or more form fillable fields though which a user may enter information defining the conceptual components and properties thereof. Other ways to define conceptual components may be possible as well.

At block 408, the computing device may define associative components and properties thereof. The computing device may define the conceptual components in various ways, which may be similar to the ways the computing device defined the conceptual components. As one possibility, the computing device may cause a client station 112 to present a GUI of some kind, through which a user may provide a user input or a set of user inputs providing information or instructions to facilitate the computing device defining the associative components. As one example of this, the client station 112 may present a selection menu presenting possible associative components and possible properties that may be selected. As another example, the computing device may cause a client station 112 to present a GUI with one or more form fillable fields though which a user may enter information defining the associative components and properties thereof. Other ways to define associative components may be possible as well.

And at block 410, the computing device may assign to each property of each component a semantic data type and a structural data type. The computing device may define the conceptual components in various ways, which may be similar to the ways the computing device defined the conceptual components. As one possibility, the computing device may cause a client station 112 to present a GUI of some kind, through which a user may provide a user input or a set of user inputs providing information or instructions to facilitate the computing device defining the associative components. As one example of this, the client station 112 may present a selection menu presenting possible associative components and possible properties that may be selected. As another example, the computing device may cause a client station 112 to present a GUI with one or more form fillable fields though which a user may enter information defining the associative components and properties thereof. Other ways to define associative components may be possible as well.

B. Digital Content Creation

Figure 5:
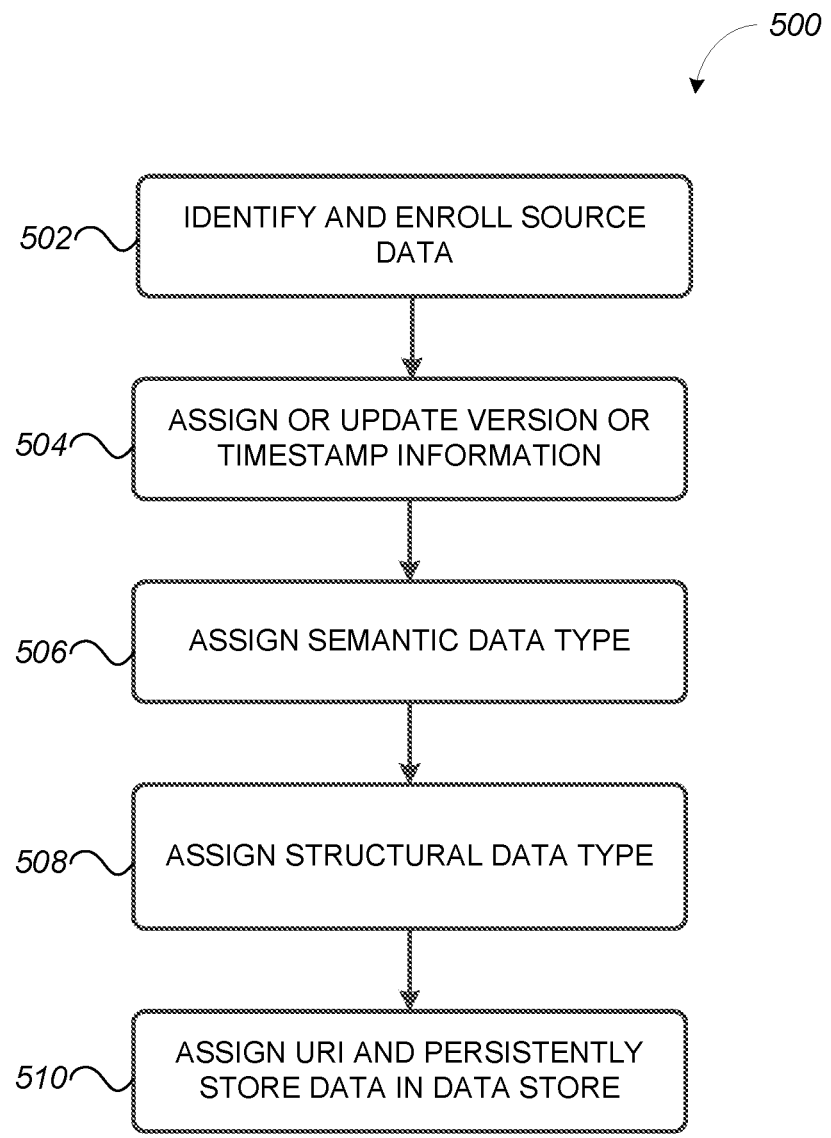
FIG. 5 is a flow diagram depicting example operations that may be carried out in accordance with one or more embodiments of the present disclosure.

A computing system (such as back-end platform 102) may facilitate the creation of digital content by a process of ingesting organization data and storing it as an instance of the digital context. To illustrate how the system may ingest data into the system and thus store it as an instance of a digital duplicate in accordance with one example of the above-described schema, reference is made to a flow diagram 500 of FIG. 5. At a high level, the ingestion process may involve contextualizing and storing in the data store each piece of inbound data. Generally, this process may be used to ingest data for (a) an initial population of data to form an initial instance of a digital duplicate, and (b) subsequent automated or manual refreshes of the digital duplicate instance from all data sources on a regular cadence (e.g. every 10 minutes, although other examples may be possible).

Turning first to block 502, a computing device may first identify and enroll source data that will be used to populate the digital context to form a digital duplicate. As a general matter, the computing device may do this by establishing connections to one or more data sources so that the computing device can begin to ingest an organization's data from these one or more data sources. For instance, the computing device may cause a client station 112 to present a GUI through which a user may provide a user input or set of user inputs that provides to the computing device data source configuration information, including for instance, data source location information (e.g., IP address or other network address), data format information, data timing information identifying how often the computing device will ingest new data from the data source (e.g., 10 minutes), and any credentials necessary for accessing the organization's data at the data sources. Using this information, the computing device may connect to and begin to ingest the organization's data. Other ways to identify and enroll data sources may be possible as well.

After the data is initially ingested, the computing device may contextualize the ingested data, which at a high level generally includes assigning or updating a version number or timestamp to the data, assigning a semantic data type to the data, assigning a structural data type to the data, and/or assigning a URI to the data. Thus, turning next to block 504, the computing device may assign or update a version number or timestamp to the data. For instance, when the computing device initially ingests a piece of data from a given data source, the computing device may assign a version number and/or mark or otherwise associate the data with a timestamp that indicates the time of ingestion. When the computing device updates this ingested data by receiving a new version of the piece of data from the data source, the computing device may increment the version number and/or update the timestamp.

At block 506, the computing device may assign a semantic data type to the ingested data. The computing device may do this in various ways. As one possibility, as part of the identification and enrollment of the data source (block 502), the computing device may have established that a particular semantic data type should be applied to various data ingested from the particular data source. For instance, a user may have provided one or more user inputs at this step indicating that some or all data ingested from the particular data source should have a particular semantic data type assigned thereto. In this case, the computing device may assign this semantic data type to the ingested data. As another possibility, the computing device may cause a client station 112 to present to a user a GUI through which the user may select certain ingested data and then select or otherwise provide a user input that assigns a semantic data type to that ingested data. Other ways to assign a semantic data type to the ingested data may be possible as well.

At block 508, the computing device may assign a structural data type to the ingested data. The computing device may do this in various ways, similar to the possibilities described above. As one possibility, as part of the identification and enrollment of the data source (block 502), the computing device may have established that a particular structural data type should be applied to various data ingested from the particular data source. For instance, a user may have provided one or more user inputs at this step indicating that some or all data ingested from the particular data source should have a particular structural data type assigned thereto. In this case, the computing device may assign this structural data type to the ingested data. As another possibility, the computing device may cause a client station 112 to present to a user a GUI through which the user may select certain ingested data and then select or otherwise provide a user input that assigns a structural data type to that ingested data. Other ways to assign a structural data type to the ingested data may be possible as well.

At block 510, the computing device may assign URIs or other identifying indicators to the ingested data. Assigning URIs or other identifying indicators to the ingested data may serve various purposes and provide various advantages. For instance, assigning URIs or other identifying indicators to the ingested data may serve to associate the ingested data with various properties for the digital context and thus may associate the data with the appropriate semantic data type for each individual property. As another example, assigning URIs or other identifying indicators to the ingested data may, associate the data with appropriate conceptual components of the structural context. And as another example, assigning URIs or other identifying indicators to the ingested data may and serve to associate the ingested data with associative components of the structural context. The computing device may then persistently store the ingested data in the data store (e.g., data store 303) along with the assigned URIs.

V. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

We claim:

1. A computing system comprising:
a network interface;
at least one processor;
a non-transitory computer-readable medium; and
program instructions stored on the non-transitory computer-readable medium that are executable by the at least one processor to cause the computing system to perform functions including:
connecting to a plurality of distinct data repositories housing source data;
establishing a data structure to be populated with source data such that the data structure comprises (i) a semantic context having at least two data types, and (ii) a structural context having a plurality of data components, wherein the plurality of data components comprises a plurality of established network components each having associated therewith one or more respective data properties to be populated with source data, wherein the plurality of established network components comprises (i) a plurality of conceptual components and (ii) at least one associative component, wherein each associative component links together two or more of the conceptual components by being comprised of references to each of the two or more conceptual components; and
after establishing the data structure, (i) identifying a plurality of portions of source data previously unassociated with the established data structure that are to be used to populate the established data structure, wherein each identified portion is stored in a different one of the plurality of distinct data repositories, (ii) for each identified portion of source data, assigning the identified portion of source data to respective one or more established network components from the plurality of conceptual components and the at least one associative component, (iii) receiving, from the plurality of distinct data repositories, the plurality of identified portions of source data and (iv) for each identified portion of source data, populating the identified portion of source data into respective data properties of the respective one or more established network components to which the identified portion of source data is assigned, so as to form a traversable data network within the established data structure.

2. The computing system of claim 1, wherein the plurality of conceptual components are configured to contain data describing a particular aspect of an organization.

3. The computing device of claim 1, wherein the plurality of conceptual components are configured to contain data describing a particular aspect of at least one or more of an individual, a time, a place, or an entity.

4. The computing system of claim 1, wherein each associative component of the at least one associative component is configured to contain data describing a particular aspect of an organization and a relationship between two or more conceptual components.

5. The computing system of claim 1, wherein each associative component of the at least one associative component is configured to contain data describing (a) a particular aspect of at least one or more of an individual, a time, a place, or an entity, and (b) a relationship between two or more conceptual components.

6. The computing system of claim 1, wherein the at least two data types of the semantic context comprise (a) a structural data type configured to contain data describing how the source data is stored within the computing system, and (b) a semantic data type configured to contain data describing the semantic meaning of and definitional aspects of the source data.

7. The computing system of claim 6, wherein the structural data type is at least one of a temporal data type, a spatial data type, a physical data type, personal data type, a quantitative data type or a categorical data type.

8. The computing system of claim 6, wherein the definitional aspects of the source data include a primitive data type and at least one instance of pointer data configured to identify a location in data storage communicatively coupled to the computing system that contains data defining a function for application to the source data having the same semantic data type.

9. The computing system of claim 1, wherein the plurality of distinct data repositories comprises data repositories selected from the group consisting of business systems, enterprise data stores, data warehouses, data lakes, and operational data stores.

10. The computing system of claim 1, wherein the plurality of distinct data repositories comprises a first data repository and a second data repository, wherein source data contained within the first data repository relates to a first aspect of an organization, and wherein source data contained within the second data repository relates to a second aspect of the organization.

11. The computing system of claim 1, wherein the program instructions are further executable to cause the computing system to: retrieve a subset of the data structure based on traversal of a data network based on the data structure; and present the data structure via one or more client stations.

12. The computing system of claim 1, wherein the at least two data types of the semantic context comprise a plurality of semantic data types, each semantic data type configured to contain data describing semantic meaning of and definitional aspects of source data, and wherein the program instructions are further executable to cause the computing system to assign to each of the respective data properties of each of the established network components a given semantic data type of the plurality of semantic data types, and wherein source data populated into respective data properties that are different but have the same semantic data type is configured to be associated with a given function that utilizes the source data populated into the respective data properties.

13. The computing system of claim 1, wherein the established data structure is based on a neurosynaptic model wherein associative information is stored at intersection points of structural components.

14. The computing system of claim 1, wherein each of the plurality of conceptual components are configured to contain data describing a particular aspect of an organization, and wherein the program instructions are further executable to cause the computing system to perform functions including:
update the established data structure to represent a current structure of the organization by promoting a given data property of the one or more respective data properties for a given conceptual component from a data property for the given conceptual component to a new conceptual component for the established data structure, wherein the new conceptual component is linked to another conceptual component of the plurality of conceptual components via a given associative component.

15. The computing system of claim 1, wherein the established data structure is a neurosynaptic data structure that describes data using a directory, a dictionary, and semantic and structural data types.

16. The computing system of claim 1, wherein the program instructions are further executable to cause the computing system to perform functions including: after establishing the data structure, identifying the plurality of distinct data repositories, wherein each of the identified plurality of distinct data repositories was previously unassociated with the established data structure, and wherein: connecting to the plurality of distinct data repositories housing source data comprises connecting to the identified plurality of distinct data repositories, and identifying the plurality of portions of source data previously unassociated with the established data structure that are to be used to populate the established data structure comprises identifying the plurality of portions of source data from among data stored in the identified plurality of distinct data repositories.

17. A method comprising:
connecting to a plurality of distinct data repositories housing source data;
establishing a data structure to be populated with source data such that the data structure comprises (i) a semantic context having at least two data types, and (ii) a structural context having a plurality of data components, wherein the plurality of data components comprises a plurality of established network components each having associated therewith one or more respective data properties to be populated with source data, wherein the plurality of established network components comprises (i) a plurality of conceptual components and (ii) at least one associative component, wherein each associative component links together two or more of the conceptual components by being comprised of references to each of the two or more conceptual components; and
after establishing the data structure, (i) identifying a plurality of portions of source data previously unassociated with the established data structure that are to be used to populate the established data structure, wherein each identified portion is stored in a different one of the plurality of distinct data repositories, (ii) for each identified portion of source data, assigning the identified portion of source data to respective one or more established network components from the plurality of conceptual components and the at least one associative component, (iii) receiving, from the plurality of distinct data repositories, the plurality of identified portions of source data and (iv) for each identified portion of source data, populating the identified portion of source data into respective data properties of the respective one or more established network components to which the identified portion of source data is assigned, so as to form a traversable data network within the established data structure.

18. The method of claim 17, wherein the plurality of conceptual components are configured to contain data describing a particular aspect of an organization.

19. The method of 12, wherein each associative component of the at least one associative component is configured to contain data describing a particular aspect of an organization and a relationship between two or more conceptual components.

20. The method of claim 17, wherein the at least two data types of the semantic context comprise (a) a structural data type configured to contain data describing how the source data is stored within a computing system, and (b) a semantic data type configured to contain data describing the semantic meaning of and definitional aspects of the source data.

21. The method of claim 20, wherein the definitional aspects of the source data include a primitive data type and at least one instance of pointer data configured to identify a location in data storage communicatively coupled to the computing system that contains data defining a function for application to the source data having the same semantic data type.

22. The method of claim 17, wherein the plurality of distinct data repositories comprises data repositories selected from the group consisting of business systems, enterprise data stores, data warehouses, data lakes, and operational data stores.

23. The method of claim 17, wherein the plurality of distinct data repositories comprises a first data repository and a second data repository, wherein source data contained within the first data repository relates to a first aspect of an organization, and wherein source data contained within the second data repository relates to a second aspect of the organization.

24. A non-transitory computer-readable storage medium having program instructions stored thereon that are executable to cause a computing system to:
- connect to a plurality of distinct data repositories housing source data;
- establish a data structure to be populated with source data such that the data structure comprises (i) a semantic context having at least two data types, and (ii) a structural context having a plurality of data components, wherein the plurality of data components comprises a plurality of established network components each having associated therewith one or more respective data properties to be populated with source data, wherein the plurality of established network components comprises (i) a plurality of conceptual components and (ii) at least one associative component, wherein each associative component links together two or more of the conceptual components by being comprised of references to each of the two or more conceptual components; and
- after establishing the data structure, (i) identify a plurality of portions of source data previously unassociated with the established data structure that are to be used to populate the established data structure, wherein each identified portion is stored in a different one of the plurality of distinct data repositories, (ii) for each identified portion of source data, assign the identified portion of source data to respective one or more established network components from the plurality of conceptual components and the at least one associative component, (iii) receive, from the plurality of distinct data repositories, the plurality of identified portions of source data and (iv) for each identified portion of source data, populate the identified portion of source data into respective data properties of the respective one or more established network components to which the identified portion of source data is assigned, so as to form a traversable data network within the established data structure.

25. The computer-readable storage medium of claim 24, wherein the plurality of conceptual components are configured to contain data describing a particular aspect of an organization.

* * * * *